(12) United States Patent
Ness et al.

(10) Patent No.: US 11,563,245 B2
(45) Date of Patent: Jan. 24, 2023

(54) ARRANGEMENT FOR COOLING OF ELECTRICAL ENERGY STORAGE UNITS

(71) Applicant: Scania CV AB, Södertälje (SE)

(72) Inventors: Christian Ness, Nykvarn (SE); Marcus Wallin, Hägersten (SE)

(73) Assignee: Scania CV AB, Södertälje (SE)

( * ) Notice: Subject to any disclaimer, the term of this patent is extended or adjusted under 35 U.S.C. 154(b) by 81 days.

(21) Appl. No.: 16/772,504

(22) PCT Filed: Dec. 13, 2018

(86) PCT No.: PCT/SE2018/051306
§ 371 (c)(1),
(2) Date: Jun. 12, 2020

(87) PCT Pub. No.: WO2019/125284
PCT Pub. Date: Jun. 27, 2019

(65) Prior Publication Data
US 2020/0403280 A1 Dec. 24, 2020

(30) Foreign Application Priority Data
Dec. 21, 2017 (SE) .................... 1751602-2

(51) Int. Cl.
H01M 10/613 (2014.01)
H01M 10/625 (2014.01)
(Continued)

(52) U.S. Cl.
CPC ........... H01M 10/613 (2015.04); B60L 58/26 (2019.02); H01M 10/625 (2015.04);
(Continued)

(58) Field of Classification Search
None
See application file for complete search history.

(56) References Cited

U.S. PATENT DOCUMENTS 5,756,227 A * 5/1998 Suzuki ............... H01M 10/625
429/62
6,225,788 B1 5/2001 Kouzu
(Continued)

FOREIGN PATENT DOCUMENTS

DE 102009035487 A1 2/2011
DE 102010021811 A1 12/2011
(Continued)

OTHER PUBLICATIONS

SCANIA CV AB, European Patent Application No. 18891515.1, Extended European Search Report, dated Aug. 11, 2021.
(Continued)

*Primary Examiner* — Eugenia Wang
(74) *Attorney, Agent, or Firm* — Moore & Van Allen PLLC; W. Kevin Ransom

(57) ABSTRACT

The present invention relates to an arrangement for cooling of a plurality of electrical energy storage units. The arrangement comprises a tubular element forming a cooling channel for a cooling medium which has an extension between an inlet opening and an outlet opening. The tubular element comprises a first plane wall element and a second plane wall element arranged in parallel at a distance from each other which is smaller than the height of the electrical energy storage units and that the first plane wall element comprises through holes each configured to receive and define a mounting position of an electrical energy storage unit in the cooling channel.

15 Claims, 3 Drawing Sheets

(51) Int. Cl.
  *H01M 10/643* (2014.01)
  *H01M 10/6566* (2014.01)
  *H01M 10/6556* (2014.01)
  *B60L 58/26* (2019.01)
  *H01M 10/6563* (2014.01)

(52) U.S. Cl.
  CPC ..... *H01M 10/643* (2015.04); *H01M 10/6556* (2015.04); *H01M 10/6563* (2015.04); *H01M 10/6566* (2015.04)

(56) References Cited

U.S. PATENT DOCUMENTS

| | | | |
|---|---|---|---|
| 6,613,472 | B1 | 9/2003 | Watanabe |
| 10,483,606 | B2 | 11/2019 | Kreisel et al. |
| 2001/0010878 | A1* | 8/2001 | Nakanishi ........... H01M 50/213 429/120 |
| 2007/0046259 | A1 | 3/2007 | Shimizu |
| 2011/0223458 | A1* | 9/2011 | Ferber, Jr. ........... H01M 10/613 429/99 |
| 2014/0162106 | A1 | 6/2014 | Fuerstner et al. |
| 2015/0188203 | A1 | 7/2015 | Enomoto et al. |
| 2015/0333382 | A1* | 11/2015 | Mingers ................ H01M 10/65 429/120 |
| 2016/0111762 | A1 | 4/2016 | Kawakami et al. |
| 2018/0316074 | A1* | 11/2018 | Kreisel ............... H01M 10/617 |

FOREIGN PATENT DOCUMENTS

| | | |
|---|---|---|
| DE | 102011000575 A1 | 8/2012 |
| DE | 102014214002 A1 | 4/2016 |
| JP | 2012054202 A | 3/2012 |
| JP | 2016081771 A | 5/2016 |
| KR | 20000069332 A | 11/2000 |
| KR | 20060060808 A | 6/2006 |
| KR | 20120044790 A | 5/2012 |
| WO | 2011149868 A1 | 12/2011 |
| WO | 2017003510 A1 | 1/2017 |
| WO | 2017067923 A1 | 4/2017 |

OTHER PUBLICATIONS

SCANIA CV AB, International Application No. PCT/SE2018/051306, International Search Report, dated Jan. 10, 2019.
SCANIA CV AB, International Application No. PCT/SE2018/051306, Written Opinion, dated Jan. 10, 2019.
SCANIA CV AB, Swedish Application No. 1751602-2, Office Action, dated Jun. 11, 2018.
SCANIA CV AB, Korean Patent Application No. 10-2020-7015824, Office Action, dated Aug. 26, 2021.
SCANIA CV AB, International Application No. PCT/SE2018/051306, International Preliminary Report on Patentability, dated Jun. 23, 2020.
SCANIA CV AB, Brazilian Patent Application No. BR112020010769-7, Preliminary Office Action, dated Jul. 19, 2022.
Scania CV AB, European Patent Application No. 18891515.1, Communication pursuant to Article 94(3) EPC, dated Nov. 18, 2022.

* cited by examiner

ARRANGEMENT FOR COOLING OF ELECTRICAL ENERGY STORAGE UNITS

CROSS-REFERENCE TO RELATED APPLICATIONS

This application is a national stage application (filed under 35 § U.S.C. 371) of PCT/SE2018/051306, filed Dec. 13, 2018 of the same title, which, in turn, claims priority to Swedish Application No 1751602-2 filed Dec. 21, 2017; the contents of each of which are hereby incorporated by reference.

FIELD OF THE INVENTION

The present invention relates to an arrangement for cooling of electrical energy storage units.

BACKGROUND OF THE INVENTION

Hybrid vehicles and pure electric vehicles may comprise an electric machine which alternately works as motor and generator, an electric energy storage for storing of electrical energy and power electronics for controlling the flow of electrical energy between the electrical energy store and the electric machine. The electrical energy storage has an optimal efficiency within a relatively low temperature range. Furthermore, an electrical energy storage should not be heated to a temperature above a maximum temperature for safety reasons. Consequently, it is important to provide an efficient cooling of the electrical energy storage during operation.

Rectangular battery cells may be bundled into compact battery modules. Traditionally, such battery modules are arranged on a cooling plate and cooled from the underside by a coolant circulating in heat transferring contact with the cooling plate. Due to the fact that it is not possible to arrange cylindrical battery cells in compact battery modules, cylindrical battery cells have to be cooled in a more or less separate state. It is known to cool cylindrical battery cells in a row between two cooling plates provided with half circular recesses. In this case, the cooling plates have a complicated shape and they are large and space consuming.

US 2007/0046259 shows a battery array which cools cylindrical battery modules by flowing cooling air through a holder case housing three or more levels of battery modules. Each battery module comprises a plurality of individual battery cells joined in a straight-line fashion. The holder case is provided with opposing side wall elements defining a flow path of the cooling air in contact with the battery modules. The battery array is provided with an inlet air duct directing air to the holder cases and an exhaust duct receiving air from the holder case.

US 2014/0162106 shows a battery arrangement for cooling a battery in the form of a plurality of cylindrical battery cells. The battery cells are arranged parallel to one another so that an intermediate space exist between adjacent battery cells. A terminal plate and a perforated plate are arranged above the battery. Coolant is sprayed through holes of the perforated plate. The coolant is temporarily accommodated in splash pots of the terminal plate before it passes down through holes in the terminal plate and into the intermediate spaces between the battery cells.

SUMMARY OF THE INVENTION

The object of the present invention is to provide an arrangement providing an effective cooling of electrical energy storage units in a simple and reliable manner.

This object is achieved by the arrangement described herein. The arrangement comprises a tubular element forming a cooling channel in which a plurality of electrical energy storage units are to be cooled by a circulating cooling medium. The electrical energy storing units may be battery cells or battery modules comprising a number of battery cells. The tubular element is an element provided with opposing wall elements defining a flow path, also referred to as a cooling channel in this disclosure, from a first end of the tubular element to second opposite end of the tubular element. According to one embodiment, the tubular element comprises opposite end walls, and at least one opening is provided in a first end wall and a at least one opening is provided in the opposite end wall. The openings are connected to a circuit comprising a cooling medium and a pump for pumping the cooling medium through the circuit and, thereby, through the tubular element via said openings. The tubular element comprises a first plane wall element and a second plane wall element arranged in parallel at a distance from each other which is smaller than a height of the electrical energy storage units. The first plane wall element is connected to the second plane wall element by third and fourth side wall elements, such that said flow path/cooling channel is defined. End walls may be arranged opposite to each other at ends of the mentioned wall elements. Furthermore, the first plane wall element comprises through holes each configured to receive and define a mounting position for one electrical energy storage unit in the cooling channel. According to one embodiment, the arrangement comprises at least one electrical energy storage unit, which is inserted in a through hole in the first plane wall element and which extends in a longitudinal direction thereof from said first plane wall element towards the second plane wall element. The electrical energy storage unit protrudes through the through hole, and comprises a positive and/or negative electrical pole at an end of the electrical energy storage unit, said pole being exposed outside said cooling channel and being accessible from outside the tubular element.

Such a design of the tubular element makes it is possible to insert each electrical energy unit via a through hole in the first wall element to a mounting position in the tubular element. In the mounting position, a bottom surfaces of each electrical energy unit may be supported by an inner surface of the second wall element. Furthermore, an upper portion of each electrical energy unit may supported by the surfaces of the first wall element defining the through holes. Preferably, the distance between the first wall element and the second wall element is only slightly smaller than the height of the electrical energy storage units. Such a design of the tubular elements results in that substantially the entire circumferential surface, preferably at least 90%, of each electrical energy storage unit is arranged in the cooling channel and in contact with the cooling medium flowing through the cooling channel. The large heat transfer contact surface with the cooling medium results in an effective cooling of the electrical energy storage units. In this case, only an end portion of each electrical energy storage unit which comprises a positive pole and a negative pole of the electrical energy storage units is arranged on the outside of the cooling channel.

According to an embodiment of the invention, the second wall element also comprises through holes in corresponding position as the through holes in the first wall element. A corresponding position may be referred to as a position opposite a through hole in the first plane wall element. If electrical energy storage units are used having the positive pole and the negative pole in opposite end portions, it is necessary to arrange both end portions of the electrical energy storage units on the outside of the cooling channel in order to able connection of the pools to electrical components which are on the outside of the cooling channel. According to one embodiment the arrangement comprises at least one electrical energy storage element which protrudes with a first end through a through hole in the first wall element and protrudes with a second end through an opposite through hole in the second wall element. According to one embodiment, the arrangement comprises a plurality of such electrical energy storage elements, with such design and position.

According to an embodiment of the invention, said through holes have a corresponding size and shape as the outer circumferential shape of the electrical energy storage units. Such a design of the through holes makes it is possible to insert an electrical energy storage unit, via the through hole, to a mounting position in the cooling channel. The through holes may have a circular shape and that the electrical energy storage units may be shaped as right circular cylinders. Thus, the electrical energy storage units have a circular circumference surface with no sharp edges or other kinds of irregularities which may disturb the flow through the cooling channel. In this case, it is possible to provide a cooling medium flow through the cooling channel with a low flow resistance. However, it is not excluded to use electrical energy storage units which has a different circumference shape.

According to an embodiment of the invention, the through holes are arranged in a number of transverse rows in relation to the intended flow direction of the cooling medium through the cooling channel and that the through holes in two adjacent transverse rows are transversely displaced in relation to each other. Preferably, the through holes and thus the electrical energy storage units also are arranged at equal distance from adjacent electrical energy storage units in the transverse row. Such a positioning of the electrical energy storage units results in an equally distributed flow between the electrical energy storage units and a uniform efficient cooling of the individual electrical energy storage units.

According to an embodiment of the invention, the arrangement comprises a sealing member for each through hole which is configured to provide a tight seal between the surface defining the through hole and an outer circumferential surface of an electrical energy storage unit arranged in said through hole. Such a sealing member prevents leakage of the cooling medium from the cooling channel. The electrical energy storage units may comprise an annular recess in the outer circumferential surface configured to receive the sealing member. Such a design of the electrical energy storage units facilitates the application of the sealing member on the electrical energy storage units in an intended position at the same time as it facilitates the mounting process of the electrical energy storage units in the cooling channel.

According to an embodiment of the invention, the tubular element comprises a third wall element and a fourth wall element which are arranged in parallel and configured to connect the first wall element and the second wall element. The third wall element and the fourth wall element may be plane wall elements. In such a case, the tubular element defines a cooling channel having a rectangular cross sectional area. However, it is possible to use a third wall element and a fourth wall element with a somewhat curved shape.

According to an embodiment of the invention, the tubular element is designed as a material body in one piece. The tubular element may be a prefabricated profile element of a suitable material. The tubular element may be cast or extruded. Alternatively, the tubular element is made by separate wall elements and fastening means connecting the wall elements. The fastening means may be bolts, screws, welding joints, a solder joints etc. In this case, it is possible to provide the first wall element with the through holes before it is connected to the other wall elements.

According to an embodiment of the invention, the tubular element is made of a material having excellent heat transfer properties, preferably a metal alloy. Such a material may be aluminum. The choice of such a material facilitates the heat transfer from the tubular element to the surroundings.

According to an embodiment of the invention, the tubular element is provided with at least one additional cooling channel for a second cooling medium. If, for example, the cooling medium is ambient air or a coolant which is cooled in a radiator by ambient air, it is not possible to cool the cooling medium to a lower temperature than ambient air. During operating condition when ambient temperature is high, it is not always possible to cool the electrical energy storage units to a required low temperature by the ordinary cooling medium. In this case, it is possible to increase the cooling of the electrical energy storage units by the use of a second cooling medium which may be cooled by a refrigerant system to a lower temperature than ambient temperature. The additional cooling channel may be arranged on the outside of the third wall element and/or on the fourth wall element. According to one embodiment, the first cooling medium is a gas or gas mixture, possibly air, while the second cooling medium is a liquid, possibly a refrigerant. According to one embodiment the first cooling medium is liquid, possibly water, while the second cooling medium is another liquid, possibly a refrigerant. According to one embodiment, the arrangement comprises a first cooling circuit provided with means for cooling the first cooling medium and means for circulating the first cooling medium through the cooling channel defined by the tubular element, and a second cooling circuit provided with means for cooling the second cooling medium and circulating the second cooling medium through the additional cooling channel. The additional cooling channel may be formed by a tube arranged on the outside of and in direct contact with the tubular element, or may be a cooling channel integrated in at least one of the wall elements of the tubular element.

According to an embodiment of the invention, the arrangement comprises at least two tubular elements defining two cooling channels arranged in parallel, an inlet channel configured to direct cooling medium to the parallel cooling channels and an outlet channel configured to receive cooling medium from the parallel cooling channels. The cooling channels of the at least two tubular elements are connected in parallel, and not in series, in relation to said inlet channel and outlet channel, and with regard to a flowing direction in a cooling circuit in which the tubular elements are included. The inlet channel and the outlet channel are channels of a cooling circuit in which a pump is arranged for pumping and thereby circulating a cooling medium through the cooling circuit. The cooling channels of the at least two tubular elements may also be arranged geometrically in parallel with each other. Such a design makes it possible to direct cooling medium channel to the parallel cooling channels via a common inlet and from the parallel cooling channels via a common outlet channel. The cooling channels arranged in parallel receives cooling medium of the same low temperature. Thus, the electrical energy storing units in the parallel cooling channels obtain a corresponding cooling.

BRIEF DESCRIPTION OF THE DRAWINGS

In the following preferred embodiments of the invention are described, as examples, and with reference to the attached drawings, on which.

DETAILED DESCRIPTION OF PREFERRED EMBODIMENTS OF THE INVENTION

Figure 1:
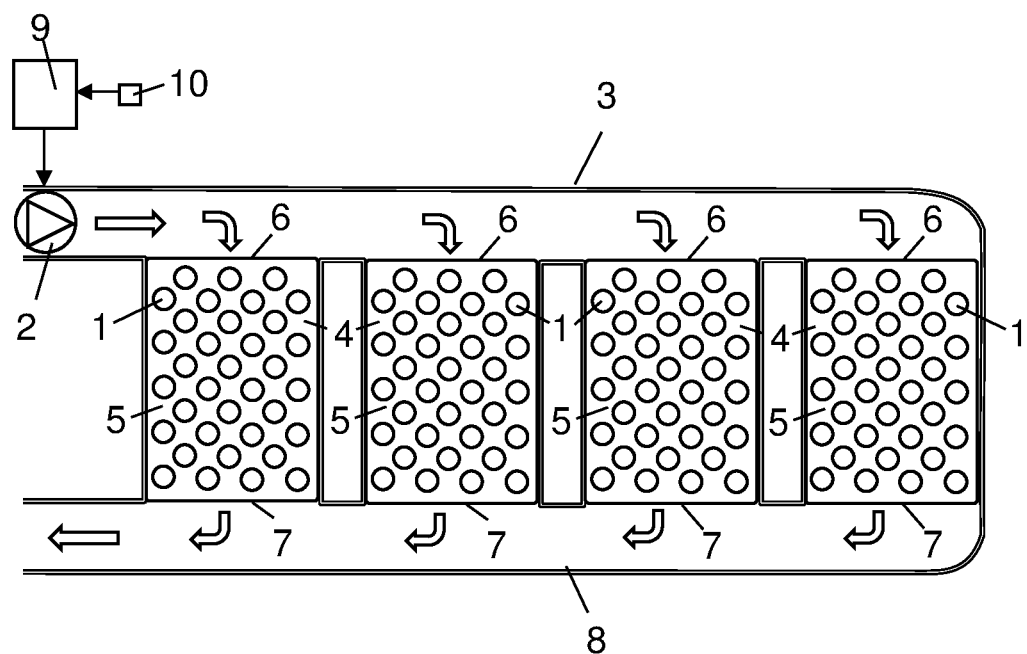
FIG. 1 shows an arrangement for cooling of battery cells.

FIG. 1 shows an arrangement for cooling of electric energy storage units. The electric energy storage units may be connected to an electrical machine for driving a hybrid vehicle or a pure electric vehicles. The electric energy storage units are exemplified as battery cells 1. The arrangement comprises a cooling medium driving member 2 providing a cooling medium flow through to an inlet channel 3. The cooling medium driving member 2 may be a pump in case the cooling medium is a liquid and a fan if the cooling medium is a gas. The cooling medium flow in the inlet channel 3 is directed to a number of tubular elements 4 arranged in parallel. Each tubular element 4 defines a cooling channel 5 having a straight extension between an inlet opening 6 and an outlet opening 7. Each cooling channel 5 accommodates a plurality of battery cells 1. In this case, the battery cells 1 are shaped as right circular cylinders. The cooling medium flows leaving the cooling channels 5 are received in a common outlet channel 8. A control unit 9 controls the operation of the cooling medium driving member 2 in view of information from a temperature sensor 10 sensing a temperature related to the temperature of the battery cells 1. The temperature sensor 10 may sense the temperature of the cooling medium in the outlet line 8. This temperature is related to the temperature of the battery cells 1. Alternatively, the temperature sensor 10 may be arranged in the cooling channel 5 in contact with one of the battery cells 1.

Figure 2:
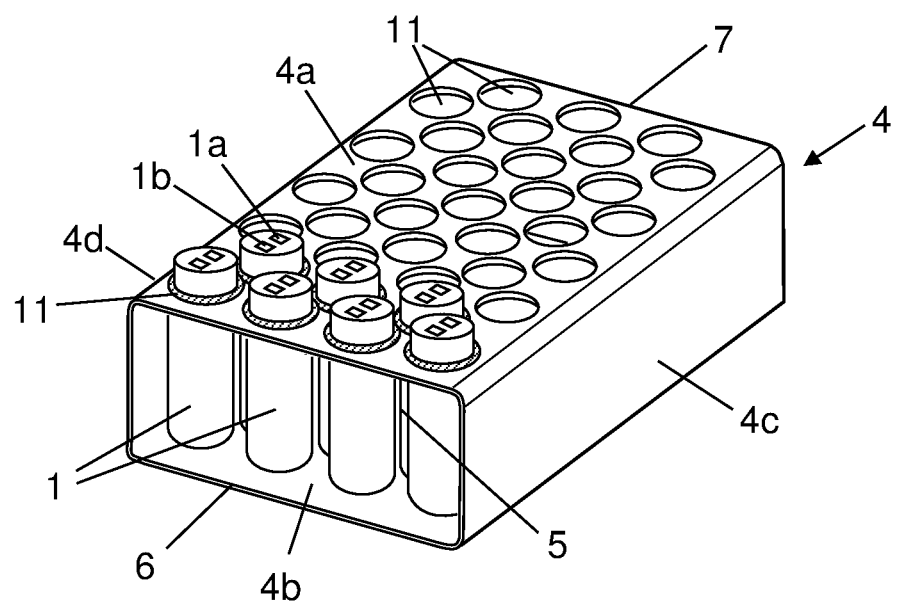
FIG. 2 shows a perspective view of one of the tubular elements 4 in FIG. 1.

FIG. 2 shows a perspective view of one of the tubular element 4 in a separate state. The tubular element 4 comprises a first wall element 4a and a second wall element 4b. The first wall element 4a and the second wall element 4b are plane wall elements which are arranged in parallel at a distance from each other. The tubular element 4 comprises a third wall element 4c and a fourth wall element 4d which are plane wall elements arranged in parallel at a distance from each other. The third wall element 4c and the fourth wall element 4d constitute side connections between the first wall element 4a and the second wall element 4b. The four plane wall elements 4a-4d define a cooling channel 5 having a substantially rectangular cross section area. In this case, the tubular element 4 is manufactured as a material body in one piece. The tubular element 5 is designed as a profile element, which may be an alumina profile. An alumina profile is inexpensive and alumina has excellent heat transfer properties.

The first wall element 4a is provided with a plurality of circular through holes 11. The circular through holes 11 have a corresponding size and shape as the outer circular circumferential of the battery cells 1. Thus, it is possible to insert a battery cell 1 into each one of the through holes 11. The distance between the first wall element 4a and the second wall element 4b is smaller than the height of the battery cells 1. In view of this fact, it is possible to insert each battery cell 1 via a through hole 11 to a mounting position in the tubular element 4 in which a bottom surfaces of the battery cell 1 is supported on an inner surface of the second wall element 4b. In the mounting position, an upper portion of the battery cell 1 is supported by the surface of the first wall element 4a defining the through hole 11.

A sealing member 11a is arranged to provide a tight sealing between the battery cell 1 and the surfaces defining the through holes 11. Since the height of the battery cells 1 are greater than the distance between the first wall element 4a and the second wall element 4b, an upper end portion of the battery cell 1 is arranged in a position outside the cooling channel 5. The upper end portion of each battery cell 1 comprises a positive pole 1a and a negative pole 1b to be connected to not shown electrical components. The through holes 11 and thus the battery cells 1 are arranged in a predetermined pattern in the cooling channel 5. In this case, the battery cells 1 are arranged in a plurality of transverse rows in relation to the intended flow direction through the cooling channel 5. The battery cells 1 are arranged at equal distances from the adjacent battery cells in the transverse row. The battery cells 1 in adjacent transverse rows are transversely displaced in relation to each other. Thus, the flow passages between adjacent battery cells 1 in a transverse row does not coincides with the flow passages between adjacent battery cells 1 in transverse row behind. Such a positioning of the battery cells 1 in the cooling channel 5 results in an even distribution of the cooling medium flow in the cooling channel 5 and a substantially uniform cooling of the battery cells 1.

During operation of the arrangement, the cooling medium driving member 2 provides a cooling medium flow through the inlet channel 3. The cooling medium flow in the inlet channel 3 is evenly distributed to the inlet openings 6 of the respective cooling channels 5. In the cooling channels 5, the cooling medium comes in contact with substantially the entire circumference surface of the battery cells 1. Thus, the battery cells 1 have a very large heat transfer surface in contact with the cooling medium flow which favors the heat transfer between the cooling medium and the battery cells 1 in the cooling channel 4. The control unit 9 controls the operation of the cooling medium drive member 2 and thus the cooling medium flow rate though the cooling channel 5 by means of information from the temperature sensor 10. The control unit 9 has access to information about a desired temperature of the battery cells 1. In case the temperature of the battery cells 1 is too high, the control unit 9 increases the speed of the cooling medium drive member 2 which results in a higher cooling medium flow rate through the cooling channel 5 and an increased cooling of the battery cells 1. In case the temperature of the battery cells 1 is too low, the control unit 9 lowers or stops the speed of the cooling medium drive member 2 which results in a lower cooling medium flow rate through the cooling channel 5 and a decreased cooling of the battery cells 1.

Figure 3:
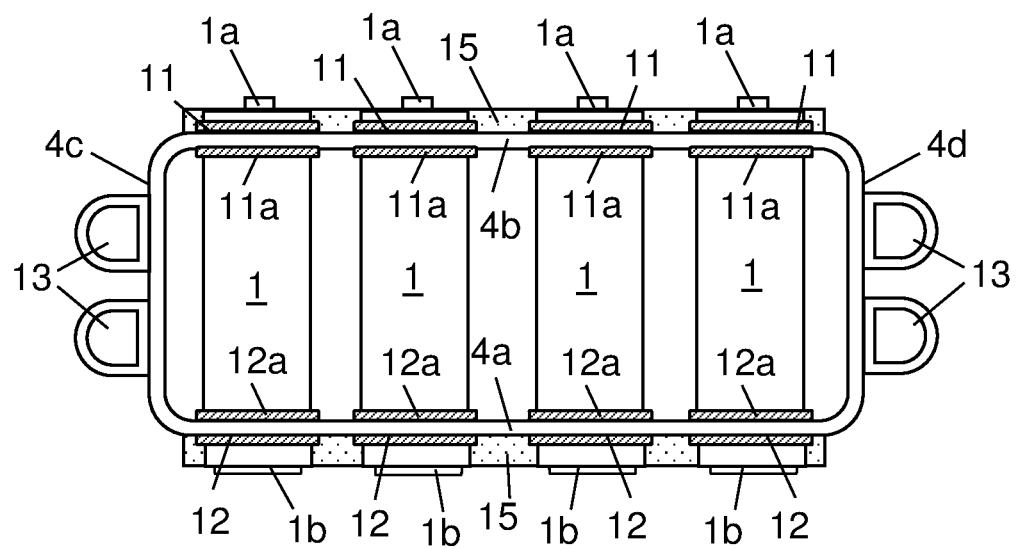
FIG. 3 shows an alternative embodiment of the tubular element.

FIG. 3 shows a front view of an alternative embodiment of the tubular element 4. In this case, the tubular element 4 comprises through holes 11 in the first wall element 4a and through holes 12 in the second wall element 4b. The through holes 12 in the second wall element 4b has a corresponding position as the through holes 11 in the first wall element 4a. In a mounted state, an upper end of the battery cells 1 is arranged in a position above the cooling channel 4 and a lower end of the battery cells 1 is arranged in a position below the cooling channel 4. The upper end of the battery cells 1 comprises a positive pole 1a and the lower end of the battery cells 1 comprises a negative pole 1b. First sealing members 11a are arranged to seal between an upper portion of the battery cells and surfaces of the first wall element 4a defining the through holes 11. Second sealing members 12a are arranged to seal between a lower portion of the battery cells 1 and surfaces of the second wall element 4b defining the through holes 12. In this case, the sealing member 11a, 12a may also be used to maintain the battery cells 1 in a desired vertical position in relation to the through holes 11, 12. Plastic bodies 15 is arranged on the outside of the first wall 4a and on the outside of the second wall 4b. The purpose of the plastic bodies 15 is to keep the battery cells 1 in intended positions. The plastic bodies 15 may include or support power rails connecting the battery cells 1. Alternatively, the plastic body 15 may be an integrated part of the sealing members 11a, 12a.

In case the ordinary cooling medium is ambient air or a coolant cooled in a radiator by ambient air, it is not possible to give the cooling medium a temperature lower than ambient temperature. In case ambient air has a high temperature, it is not always possible to provide a required cooling of the battery cells 1 by the ordinary cooling medium. In this case, it is possible to provide an additional cooling by a second cooling medium directed to additional cooling channels 13. In this case, two additional cooling channels 13 are arranged on the outside of the third wall element 4c and two additional cooling channels 13 are arranged on the outside of the fourth wall element 4d. The second cooling medium may be a coolant circulating in a cooling system which is cooled to a lower temperature than ambient temperature by a refrigeration system before it is directed to the additional cooling channels 13. Since the tubular element 4 is made of an aluminum profile, the tubular element 4 has excellent heat transfer properties. In this case, it is possible to cool the entire tubular element 4 by means of the second cooling medium. The low temperature of the tubular element 4 cools the air in the cooling channel 5 which in it turn cools the battery cells 1 to a required low temperature.

Figure 4:
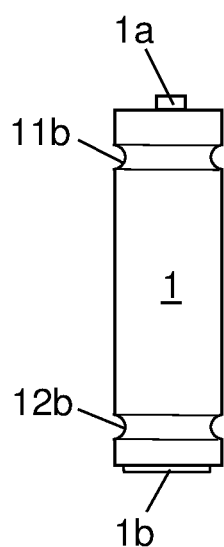
FIG. 4 shows one of the battery cells in FIG. 3 more in detail.

FIG. 4 shows one of battery cells 1 in FIG. 3 in a separated state. The battery cell 1 is provided with a first annular recess 11b receiving a first sealing member 11a and a second annular recess receiving a second sealing member 12a. Such a design of the battery cells 1 makes it relatively easy to position the sealing members 11a, 12a in an intended mounting positions on the battery cells 1. Furthermore, such a design facilitates the mounting process of the battery cells 1 in relation to the surfaces defining the through holes 11, 12.

Figure 5:
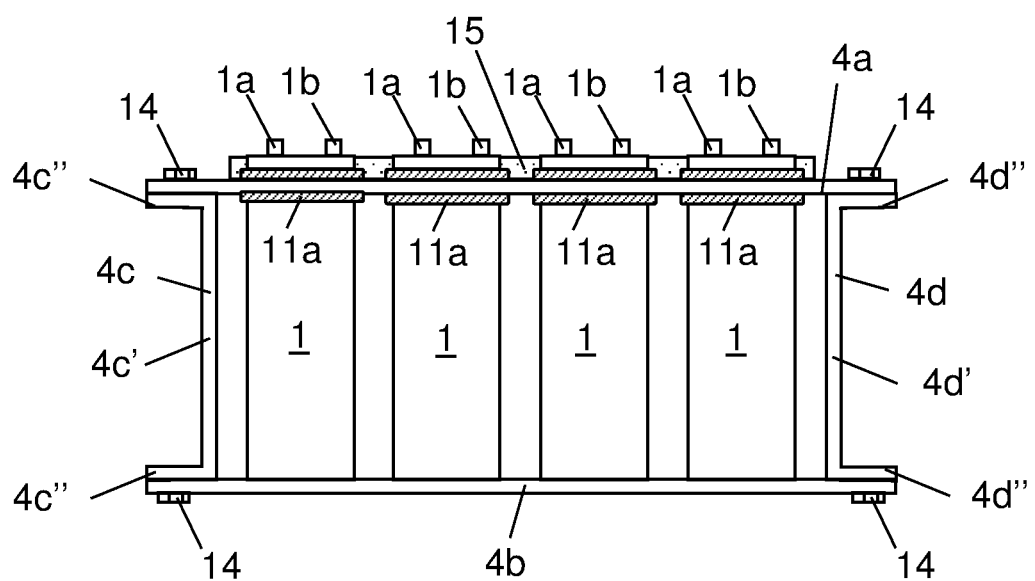
FIG. 5 shows a further alternative embodiment of the tubular element.

FIG. 5 shows a further embodiment of the tubular element 4. In this case, the tubular element 4 comprises four separate wall elements 4a-4d. A first wall element 4a and a second wall element 4b are designed as plane plates. A third wall element 4c and a fourth wall element 4d comprise each a main plane portion portions 4c', 4d' and a two connecting portions 4c", 4d". The connecting portions 4c", 4d" form a right angle to the main portions 4c', 4d'. The connecting portions 4c", 4d" are to be connected to the first wall element 4a and the second wall element 4b. In this case, the connecting portions 4c", 4d" are connected to the first wall element 4a and the second wall element 4b by means of fastening means in the form of bolts 14. Alternatively, the fastening means may be screws, welding joints, solder joints etc.

The invention is not restricted to the described embodiment but may be varied freely within the scope of the claims. The outer circumferential shape of the battery cells 1 and the through holes 11, 12 may, for example, have a non-circular shape. The electrical energy storage units do not need to be battery cells. They may, for example, be battery modules including several battery cells.

The invention claimed is:

1. An arrangement for cooling of a plurality of electrical energy storage units, wherein the arrangement comprises:
   a tubular element forming a first cooling channel in which the plurality of electrical energy storage units are to be cooled by a first cooling medium for circulating in the tubular element about the plurality of electrical storage units, wherein the tubular element comprises:
   a first plane wall element and a second plane wall element arranged in parallel at a distance from each other, where said distance is smaller than a height of the plurality of electrical energy storage units, and wherein the first plane wall element comprises through holes each configured to receive and define a mounting position for one of the electrical energy storage units of the plurality of electrical energy storage units;
   a third plane wall element and a fourth plane wall element arranged in parallel to each other and configured to connect the first plane wall element and the second plane wall element, wherein said first, second, third, and fourth plane wall elements at least partially define the first cooling channel; and
   one or more additional cooling channels configured for maintaining and circulating a second cooling medium, said one or more additional cooling channels located on a respective surface of at least two of the first, second, third, and fourth plane wall elements.

2. An arrangement according to claim 1, wherein the second wall element also comprises through holes that are located to correspond with the position of the through holes in the first wall element.

3. An arrangement according to claim 2, wherein each of said through holes in the first and second wall elements has a size and a shape corresponding to an outer circumferential shape of one of the electrical energy storage units of the plurality of electrical energy storage units.

4. An arrangement according to claim 2, wherein said through holes in the first and second wall elements have a circular shape and that each of the electrical energy storage units of the plurality of electrical energy storage units is shaped as a right circular cylinder.

5. An arrangement according to claim 2, wherein the through holes in the first and second wall elements are arranged in a number of transverse rows in relation to an intended flow direction of the first cooling medium through the first cooling channel and that the through holes in two adjacent transverse rows are transversely displaced in relation to each other.

6. An arrangement according to claim 1, wherein the arrangement comprises a sealing member which is configured to provide a tight seal between a surface defining the through holes and an outer circumferential surface of a selected one of the plurality of electrical energy storage units.

7. An arrangement according to claim 6, wherein the selected one of the plurality of electrical energy storage units comprises an annular recess in its outer circumferential surface configured to receive the sealing member.

8. An arrangement according to claim 1, wherein the tubular element is designed as a unitary piece.

9. An arrangement according to claim 1, wherein the arrangement comprises fastening means configured to connect the first, second, third, and fourth plane wall elements to each other.

10. An arrangement according to claim 1, wherein the tubular element is made of a material having heat transfer properties.

11. An arrangement according to claim 1, wherein the arrangement comprises at least two tubular elements defining two first cooling channels arranged in parallel, an inlet channel configured to direct the first cooling medium to the two first cooling channels and an outlet channel configured to receive the first cooling medium from the two first cooling channels.

12. An arrangement according to claim 1, wherein the one or more additional cooling channel is arranged on an exterior surface of both the third and fourth plane wall elements.

13. An arrangement according to claim 1, wherein said one or more additional cooling channels is located on a respective outer surface at least two of the first, second, third, and fourth plane wall elements.

14. An arrangement for cooling of a plurality of electrical energy storage units, wherein the arrangement comprises:
   a tubular element forming a first cooling channel in which the plurality of electrical energy storage units are to be cooled by a first cooling medium for circulating in the tubular element about the plurality of electrical storage units, wherein the tubular element comprises:
   a first plane wall element and a second plane wall element arranged in parallel at a distance from each other, where said distance is smaller than a height of the plurality of electrical energy storage units, and wherein the first plane wall element comprises through holes each configured to receive and define a mounting position for one of the electrical energy storage units of the plurality of electrical energy storage units in the first cooling channel;
   a third plane wall element and a fourth plane wall element arranged in parallel to each other and configured to connect the first plane wall element and the second plane wall element; and
   one or more additional cooling channels configured for maintaining and circulating a second cooling medium, wherein the one or more additional cooling channels comprises a first additional cooling channel arranged on an exterior surface of the third plane wall element, and a second additional cooling channel arranged on an exterior surface of the fourth plane wall element.

15. An arrangement for cooling of a plurality of electrical energy storage units, wherein the arrangement comprises:
   a tubular element forming a first cooling channel in which the plurality of electrical energy storage units are to be cooled by a first cooling medium for circulating in the tubular element about the plurality of electrical storage units, wherein the tubular element comprises:
   a first plane wall element and a second plane wall element arranged in parallel at a distance from each other, where said distance is smaller than a height of the plurality of electrical energy storage units, and wherein the first plane wall element comprises through holes each configured to receive and define a mounting position for one of the electrical energy storage units of the plurality of electrical energy storage units in the first cooling channel;
   a third plane wall element and a fourth plane wall element arranged in parallel to each other and configured to connect the first plane wall element and the second plane wall element; and
   one or more additional cooling channels configured for maintaining and circulating a second cooling medium, wherein the one or more additional cooling channels comprises a first and a second additional cooling channel arranged on an exterior surface of the third plane wall element, and a third and a fourth additional cooling channel arranged on an exterior surface of the fourth plane wall element.

\* \* \* \* \*